United States Patent
Suh

(10) Patent No.: US 7,230,901 B2
(45) Date of Patent: Jun. 12, 2007

(54) METHOD FOR RECORDING ADDRESS INFORMATION ON OPTICAL RECORDING MEDIUM, OPTICAL RECORDING MEDIUM INCLUDING ADDRESS INFORMATION RECORDED THEREON BY THE SAME METHOD, AND METHOD FOR DETECTING ADDRESS INFORMATION RECORDED ON THE SAME OPTICAL RECORDING MEDIUM

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 10/288,416

(22) Filed: Nov. 6, 2002

(65) Prior Publication Data

US 2003/0086349 A1 May 8, 2003

(30) Foreign Application Priority Data

Nov. 6, 2001 (KR) ............................. 2001-69002

(51) Int. Cl.
*G11B 7/0045* (2006.01)

(52) U.S. Cl. ............................................. 369/59.25
(58) Field of Classification Search ............. 369/59.25; G11B 7/00
See application file for complete search history.

(56) References Cited

U.S. PATENT DOCUMENTS

| 5,999,504 | A  | * | 12/1999 | Aoki ........................ 369/47.4 |
| 6,201,778 | B1 | * | 3/2001 | Sensyu .................... 369/53.34 |
| 6,693,873 | B2 | * | 2/2004 | Kondo et al. ............ 369/275.4 |

* cited by examiner

*Primary Examiner*—William Korzuch
*Assistant Examiner*—Joseph Haley
(74) *Attorney, Agent, or Firm*—Birch, Stewart, Kolasch & Birch, LLP

(57) ABSTRACT

Disclosed are a method for recording address information on an optical recording medium, an optical recording medium including address information recorded thereon by the same method, and a method for detecting the address information recorded on the optical recording medium. The address information is recorded on the optical recording medium by such a procedure that physical address information of the optical recording medium is ASK (Amplitude Shift Keying)-modulated so as to convert the physical address information to a wobble signal, and then a wobble-shaped recording track is formed on the optical recording medium using the converted wobble signal, thereby recording the physical address information on the recording medium. Therefore, physical address information can be accurately decoded using a phase locked loop circuit and a wobble signal detecting circuit having a simple configuration, without reducing the data recording capacity of the optical recording medium.

19 Claims, 5 Drawing Sheets

| Input data | Pre-coded data | Modified M=1 ASK modulation waveform |
|---|---|---|
| "0" | "11101110" |  |
| "1" | "11111110" |  |

< ASK modulation waveform >

| Input data | Pre-coded data | Modified M=1 ASK modulation waveform |
|---|---|---|
| "0" | "11101110" |  |
| "1" | "11111110" |  |

METHOD FOR RECORDING ADDRESS INFORMATION ON OPTICAL RECORDING MEDIUM, OPTICAL RECORDING MEDIUM INCLUDING ADDRESS INFORMATION RECORDED THEREON BY THE SAME METHOD, AND METHOD FOR DETECTING ADDRESS INFORMATION RECORDED ON THE SAME OPTICAL RECORDING MEDIUM

BACKGROUND OF THE INVENTION

1. Field of the Invention

The present invention relates to a method for recording address information on an optical recording medium, an optical recording medium including address information recorded thereon by the same method, and a method for detecting the address information recorded on the optical recording medium.

2. Description of the Related Art

A general recordable optical disc (optical recording medium) such as a DVD-RAM or a DVD-RW (Re-Writable) has a recess formed along a track having a spiral or concentric-circle form. The recessed portion is called a groove, and the remaining portion is called a land. There are two methods of recording data on the optical disc. One method is to record data on one of the groove and the land, and the other is to record data on both of them. When the groove is formed, a specific variation is formed in the wall of the groove. During the recording or reproducing operation, the specific variation produces a signal having a specific frequency. Thus, the specific variation is used as auxiliary clock means. The specific variation is called a wobble, and the signal having the specific frequency is called a wobble signal.

Meanwhile, physical address information should be formed in advance on the optical disc. To this end, a CAPA (Complementary Allocated Pit Addressing) method is used for the DVD-RAM, and a land pre-pit addressing method is used for the DVD-RW. In the CAPA method, sector-by-sector address information is formed and recorded in the pre-pit form at the head of each of the sectors for the physical addressing. The CAPA method has an advantage in that a sector-by-sector addressing can be performed, but has a problem that, because the address information is recorded on a sector-by-sector basis on the data recording region on which real data is to be recorded, the data recording capacity for recording real data is reduced.

On the other hand, the land pre-pit addressing method used in the DVD-RW has a problem that the address decoding performance may be lowered depending on the state of the disc and recording/reproducing conditions such as a tilt of the disc.

SUMMARY OF THE INVENTION

Therefore, the present invention has been made in view of the above problems, and it is an object of the present invention to provide a method for recording address information on an optical recording medium, an optical recording medium including address information recorded thereon by the same method, and a method for detecting the address information recorded on the same optical recording medium, which can decode physical address information accurately using a phase locked loop circuit and a wobble signal detecting circuit having a simple configuration, without reducing the data recording capacity of the optical recording medium.

In accordance with one aspect of the present invention, the above and other objects can be accomplished by the provision of a method for recording address information on an optical recording medium, the method comprising:

a first step of ASK (Amplitude Shift Keying)-modulating physical address information of an optical recording medium so as to convert the physical address information into a wobble signal; and a second step of forming a wobble-shaped recording track on the optical recording medium using the converted wobble signal, thereby recording the physical address information on the recording medium.

In accordance with yet another aspect of the present invention, there is provided a method for recording address information on an optical recording medium, the method comprising:

a first step of pre-coding physical address information of an optical recording medium in a predetermined recording-size basis;

a second step of ASK-modulating the pre-coded physical address information so as to convert the physical address information into a wobble signal; and a third step of forming a wobble-shaped recording track on the optical recording medium using the converted wobble signal, thereby recording the physical address information on the recording medium.

Preferably, in the first step, the physical address information is pre-coded on a 2n+4 (n=0, 1, 2, 3 . . . )-wobble basis.

In accordance with yet another aspect of the present invention, there is provided a method for detecting address information recorded on an optical recording medium on which the physical address is recorded after being pre-coded on a 2n+4 (n=0, 1, 2, 3 . . . )-wobble basis, the method comprising the steps of:

detecting an wobble signal based on light reflected from a wobble pattern of a groove as a recording track formed on the optical recording medium; and after shaping the waveform of the detected wobble signal to a square wave, recovering the physical address information by comparing/mapping the square wave on a 2n+4-wobble basis.

Preferably, an optical recording medium according to the present invention includes a wobble-shaped recording track that is formed thereon based on a wobble signal, said wobble signal being generated by ASK-modulating physical address information.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
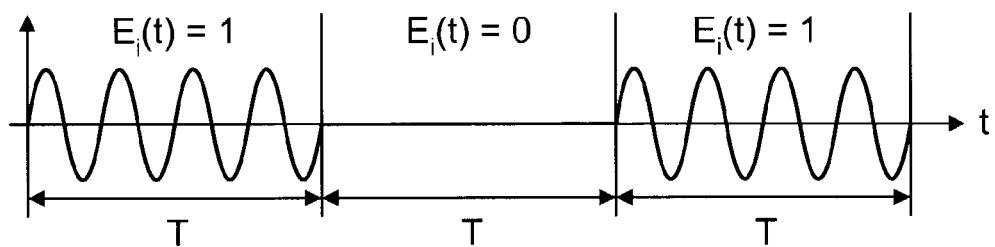
FIG. 1 is a view showing an example of ASK (Amplitude Shift Keying) modulation waveform for illustrating an ASK modulation applied to the present invention.

Referring to the drawings, a detailed description will now be given of a method for recording address information on an optical recording medium, an optical recording medium on which address information is recorded by the same method, and a method for detecting the address information recorded on the same optical recording medium, according to a preferred embodiment of the present invention.

First, a method for recording address information on an optical recording medium according to the present invention uses an ASK (Amplitude Shift Keying) modulation. The ASK modulation scheme correlates different amplitudes of sinusoidal waves having a specific frequency depending on whether or not a pulse exists. The ASK modulation scheme is expressed by the following equation.

$$S_{ASK} = \sqrt{\frac{2E_i(t)}{T}} \sin(2\pi f_c t + \phi)$$

Here, i=1, 2, 3, . . . M, 0≤t≤T

For example, in the case where M=4, as shown in FIG. 1, the ASK modulation waveform ($S_{ASK}$) has four sine waves during one period (T) when $E_i(t)=1$, and has no wave during one period (T) when $E_i(t)=0$.

Meanwhile, a wobble-signal modulation scheme using the ASK modulation according to the present invention is expressed by the following equation.

$$S_{ASK} = \sqrt{\frac{2E_i(t)}{T}} \sin(2\pi f_c t)$$

Here, i=1, 2, 3, . . . M, 0≤t≤T $f_c = f_w$ (wobble carrier frequency)

$T=T_b=1/f_w$ (input data period)

Figure 2:
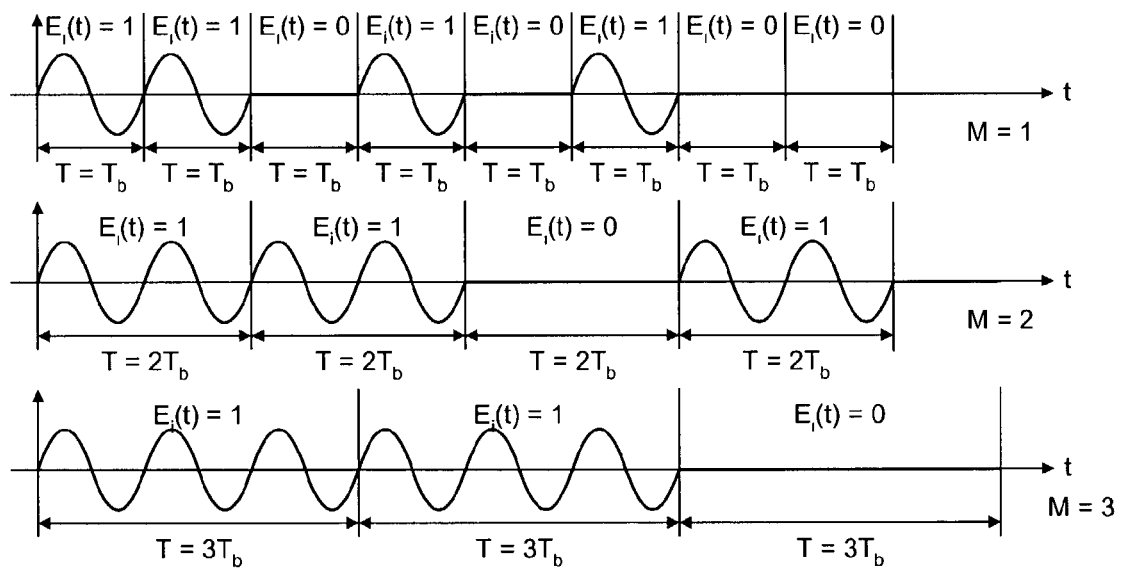
FIG. 2 is a waveform view illustrating an example of a method for ASK-modulating a wobble signal according to the present invention.

In the case where M=1, as shown in FIG. 2, the ASK modulation waveform ($S_{ASK}$) has one sine wave during an input data period ($T=T_b$) when $E_i(t)=1$, and has no wave during an input data period ($T=T_b$) when $E_i(t)=0$. In addition, in the case where M=2, the ASK modulation waveform ($S_{ASK}$) has two sine waves during an input data period ($T=2T_b$) when $E_i(t)=1$, and has no wave during an input data period ($T=2T_b$) when $E_i(t)=0$. Further, in the case where M=3, the ASK modulation waveform ($S_{ASK}$) has three sine waves during an input data period ($T=3T_b$) when $E_i(t)=1$, and has no wave during an input data period ($T=3T_b$) when $E_i(t)=0$.

Such a wobble signal modulation scheme using the ASK modulation may be applied in various cases such as M=1, 2, 3, 4, 5 . . . , but the following description will describe only the case where M=1, for the sake of a simpler explanation.

First, in the method for recording address information on an optical recording medium according to the embodiment of the present invention, input data as the address information is pre-coded to a predetermined code value, and the ASK modulation is also used.

Figure 3:
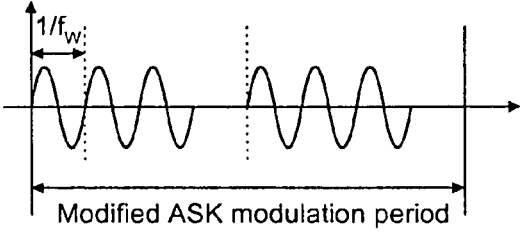
FIG. 3 is a view showing an example of a method for pre-coding a wobble signal to be ASK-modulated according to the present invention.
Figure 3:
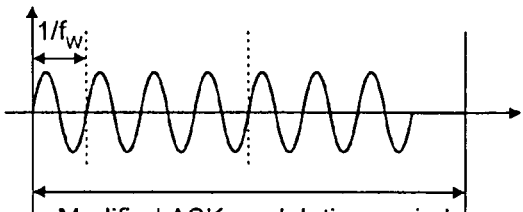

For example, as shown in FIG. 3, the input data can be ASK-modulated on an 8-wobble basis. In this case, the pre-coded data of 8 wobbles becomes '11101110' when the input data is '0', and it becomes '11111110' when the input data is '1'.

That is, when the input data is '0', the ASK modulation waveform consists of two identical and continuous portions, and each portion made of four wobble periods has three sine waves during first wobble periods and no wave during last wobble period. In addition, when the input data is '1', the ASK modulation waveform has 7 sine waves during first 7 wobble periods and no wave during last wobble period.

Meanwhile, the ASK modulation of the input data can be modulated on a 2n+4 (n=0, 1, 2, . . . )-wobble basis such as 4, 6, 8, . . . . For example, when the input data is ASK-modulated on a 4-wobble basis, the pre-coded data of 4 wobbles becomes '1010' when the input data is '0', and becomes '1110' when the input data is '1'.

Figure 4:
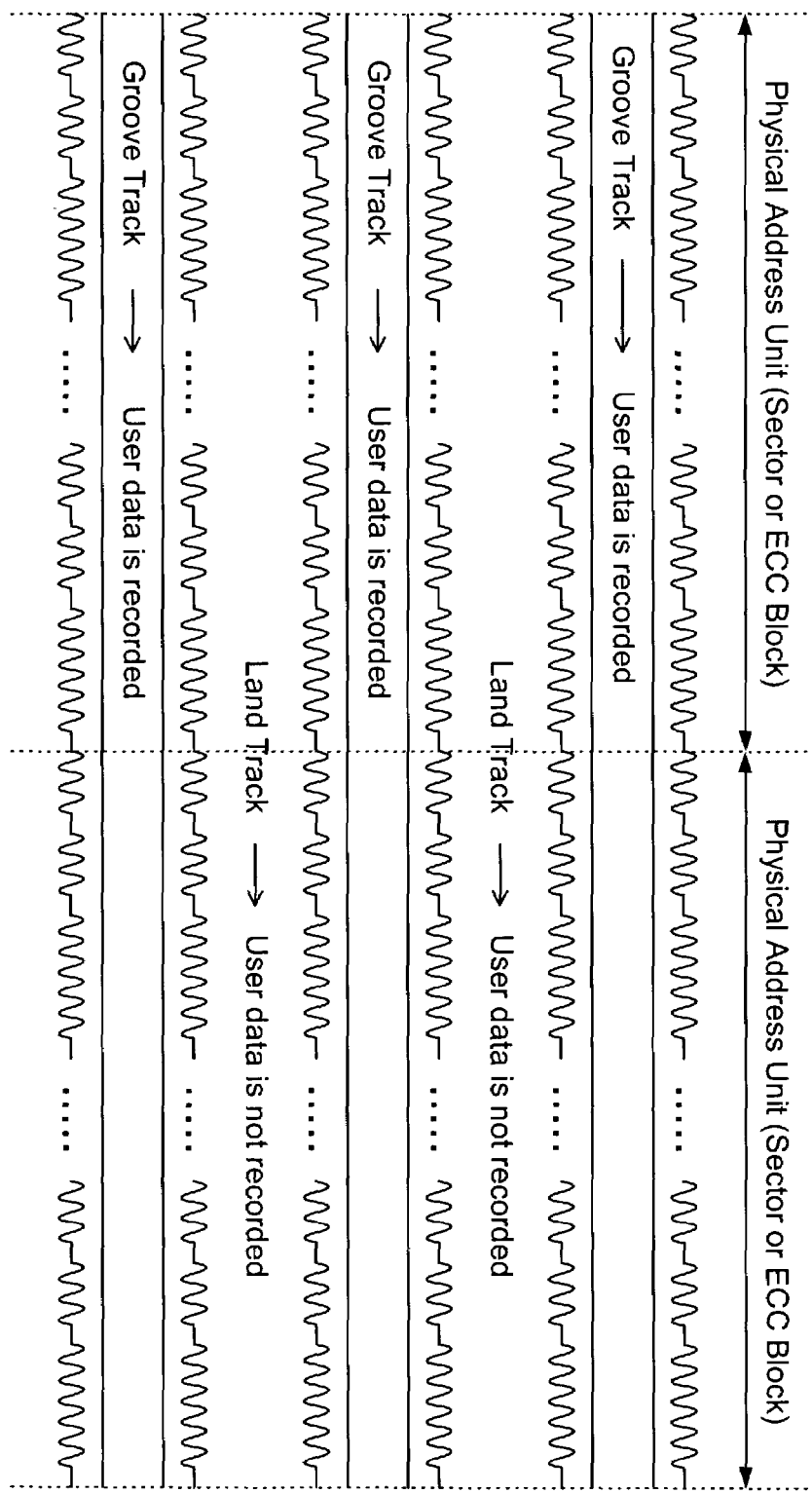
FIG. 4 is an exemplary view illustrating the waveform of a wobble signal recorded on an optical recording medium according to the present invention.

For example, an optical disc such as a GOR (Groove Only Recording) type DVD-RW, in which real data is not recorded in the land region but in the groove region, is used for an optical recording medium to which such a method for ASK-modulating and recording a wobble signal overlapped with address information is applied. In this case, as shown in FIG. 4, after the address information is pre-coded, the pre-coded data is ASK-modulated on a physical address basis such as a sector or ECC (error correction code) block to form a wobble signal as mentioned above, and a wobble-shaped groove is formed on the optical recording medium using the wobble signal, consequently achieving the forming and recording of the physical address information on the optical recording medium.

Figure 5:
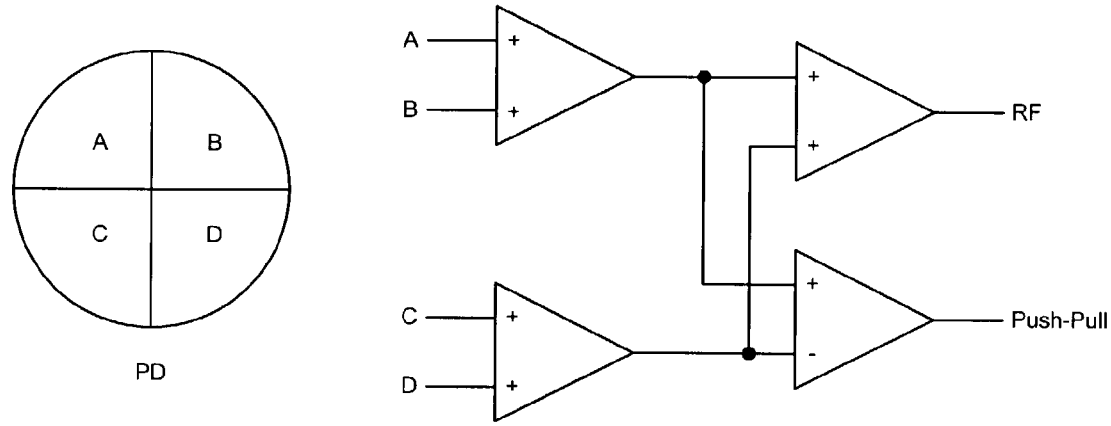
FIG. 5 is a view showing an example of a circuit for detecting the wobble signal recorded on the optical recording medium in an optical recording medium recording/reproducing device, according to the present invention.

As mentioned above, when the groove is formed on the optical recording medium, the address information is recorded in the wobble shape on the walls of the groove, based on the ASK-modulated wobble signal of the pre-coded data. The recorded address information can be detected by a general push-pull signal detecting circuit as shown in FIG. 5 during the recording/reproducing operations. That is, the push-pull signal detecting circuit includes four operational amplifiers, and receives electric signals output from A, B, C, and D regions of a 4-division photo detector included in an optical pickup. A RF signal is output from the push-pull signal detecting circuit through a RF output terminal. As a result of a logic operation of (A+B)−(C+D), a wobble signal is output as a detected signal therefrom through a push-pull output terminal.

Figure 6:
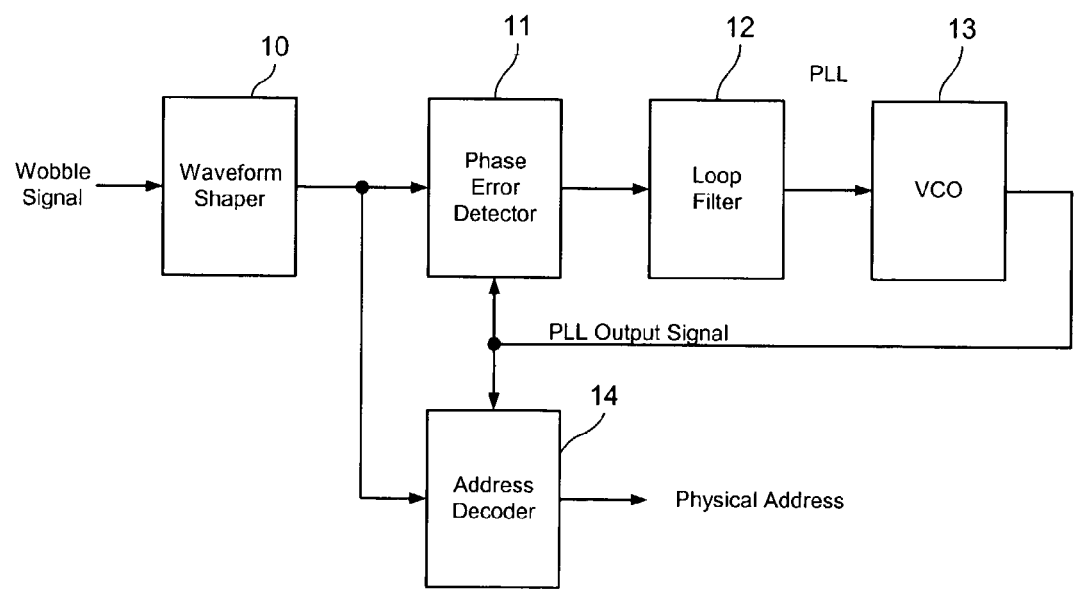
FIG. 6 is a view showing an example of a circuit for extracting physical address information from the wobble signal after detecting the wobble signal recorded on the optical recording medium in an optical recording medium recording/reproducing device, according to the present invention.
Figure 7:
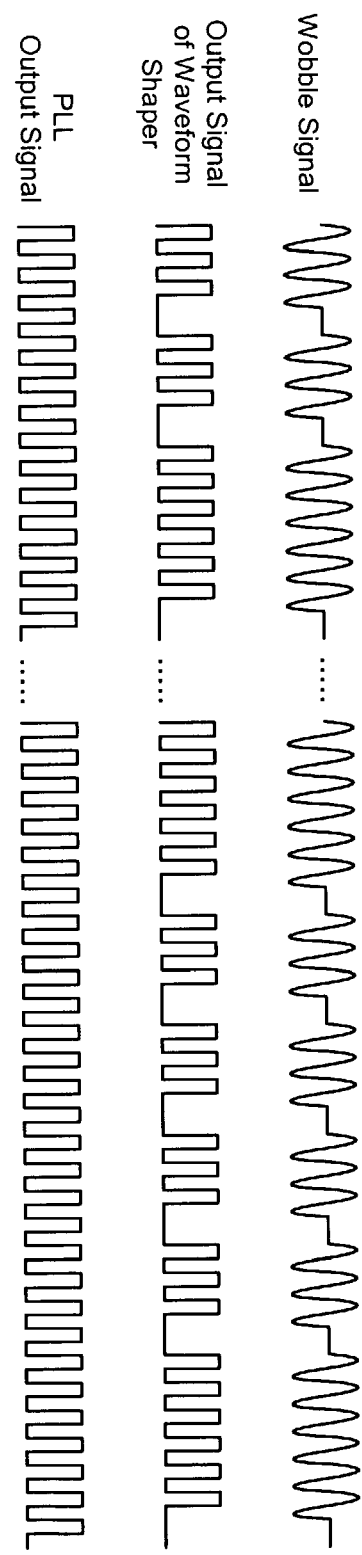
FIG. 7 is a view showing the waveform of signals in the configuration of FIG. 6.

In addition, the waveform of the wobble signal of sinusoidal wave (refer to FIG. 7) detected by the push-pull signal detecting circuit is shaped to a square wave by circuit 10, described below, as shown in FIG. 6. An address decoder 14 decodes the square wave data on a pre-coded data basis to obtain physical address information as a decoded data. In the case where an input data '0' was pre-coded to '11101110', and an input data '1' was pre-coded to '11111110', the square wave data is checked on a 8-bit basis, and if the checking result is '11101110', this is mapped to '0', and, if the checking result is '11111110', this is mapped to '1'. In such a manner, the physical address information is simply decoded. As shown in FIG. 6, such a device for obtaining the physical address information includes a general PLL (phase locked loop) circuit that comprises the phase error detector 11, the loop filter 12, and the voltage control oscillator (VCD) 13, and, differently from the prior art, further includes a waveform shaper 10 and the address decoder 14.

As apparent from the above description, the present invention has an advantage in that physical address information can be accurately decoded using a phase locked loop circuit and a wobble signal detecting circuit having a simple configuration, without reducing the data recording capacity of the optical recording medium.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recording address information on an optical recording medium, the method comprising:
   modulating physical address information of an optical recording medium using a pre-coded data so as to convert the physical address information into a wobble signal, wherein the physical address information is pre-coded on a 2n+4 (n=0, 1, 2, 3 . . . )-wobble basis, and data bits "0" and "1" comprising the physical address information are distinguished from each other such that each data bit has at least three same values and at least one different value in the pre-coded data; and
   forming a wobble-shaped recording track on the optical recording medium using the converted wobble signal, thereby recording the physical address information on the recording medium.

2. The method as set forth in claim 1, wherein the wobble-shaped recording track is a groove.

3. A method for recording address information on an optical recording medium, the method comprising:
   pre-coding physical address information of an optical recording medium in a predetermined recording-size basis;
   modulating the pre-coded physical address information using a combination of presence and absence of signal waves so as to convert the physical address information into a wobble signal, wherein the physical address information is pre-coded on a 2n+4 (n=0, 1, 2, 3 . . . )-wobble basis, and data bits "0" and "1" comprising the physical address information are distinguished from each other such that each data bit has at least three same values and at least one different value in the pre-coded data; and
   forming a wobble-shaped recording track on the optical recording medium using the converted wobble signal, thereby recording the physical address information on the recording medium.

4. The method as set forth in claim 3, wherein the wobble-shaped recording track is a groove.

5. The method as set forth in claim 4, wherein, in the pre-coding step, the physical address information is pre-coded on a 8-wobble basis.

6. A method for detecting physical address information from an optical recording medium on which a wobble signal that is generated by modulating a physical address data using a combination of presence and absence of signal waves is recorded, wherein a physical address information is pre-coded on a 2n+4 (n0, 1, 2, 3 . . . )-wobble basis. and data bits "0" and "1" comprising the physical address information are distinguished from each other such that each data bit has at least three same values and at least one different value in the modulated wobble signal, the method comprising:
   detecting the wobble signal based on light reflected from a wobble pattern of a groove formed on the optical recording medium; and
   recovering the physical address information by comparing/mapping the square wave on the 2n+4-wobble basis after shaping the waveform of the detected wobble signal to a square wave.

7. An optical recording medium comprising a wobble-shaped recording track that is formed thereon based on a wobble signal, said wobble signal being generated by modulating a physical address information using a combination of presence and absence of signal waves, wherein the physical address information is pre-coded on a 2n+4 (n=0, 1, 2, 3 . . . )-wobble basis, and data bits "0" and "1" comprising the physical address information are distinguished from each other such that each data bit has at least three same values and at least one different value in the modulated wobble signal.

8. The optical recording medium as set forth in claim 7, wherein the wobble-shaped recording track is a groove.

9. The method as set forth in claim 1, wherein the wobble signal corresponding to data bit "0" or "1" of the physical address information is made up of at least one signal followed by no signal wave.

10. The method as set forth in claim 1, wherein in the modulating step, the physical address information is modulated on a 8-wobble basis.

11. The method as set forth in claim 3, wherein the wobble signal corresponding to data bit "0" or "1" of the physical address information is made up of at least one signal followed by no signal wave.

12. The method as set forth in claim 3, wherein in the pre-coding step, the predetermined recording-size basis is an 8-wobble basis.

13. The method as set forth in claim 6, wherein the detected wobble signal corresponding to data bit "0" or "1" of the physical address information is made up of at least one signal followed by no signal wave.

14. The method as set forth in claim 7, wherein the wobble signal corresponding to data bit "0" or "1" of the physical address information is made up of at least one signal followed by no signal wave.

15. The method as set forth in claim 7, wherein the physical address information is modulated on a 8-wobble basis.

16. The method as set forth in claim 7, wherein the wobble-shaped recording track is a groove.

17. A method for recording and/or reproducing a physical address information from a recording medium, wherein the physical address information is recorded based on a wobble signal, the wobble signal being generated by modulating the physical address information. wherein the physical address information is pre-coded on a 2n+4 (n=0, 1, 2, 3 . . . )-wobble basis and the pre-coded data is modulated into the wobble signal, and data bits "0" and "1" comprising the physical address information are distinguished from each other such that each data bit has at least three same values and at least one different value in the modulated wobble signal, the method comprising:
- detecting the wobble signal using a push-pull signal detection unit;
- shaping a waveform of the detected wobble signal into a waveform of a certain shape; and
- decoding the certain shaped waveform on the pre-coded data basis to obtain the physical address information.

18. The method as set forth in claim 17, wherein the wobble signal corresponding to data bit "0" or "1" of the physical address information is made up of at least one signal wave followed by no signal wave.

19. The method as set forth in claim 17, wherein in the modulating step, the physical address information is modulated on a 8-wobble basis.

* * * * *